United States Patent
Rupp

[19]

[11] Patent Number: 6,164,686
[45] Date of Patent: Dec. 26, 2000

[54] INSTRUMENT PANEL PASSENGER SIDE AIR BAG DOOR

[75] Inventor: Marlow Wayne Rupp, Lancaster, Ohio

[73] Assignee: The Goodyear Tire & Rubber Company, Akron, Ohio

[21] Appl. No.: 09/194,419

[22] PCT Filed: Aug. 26, 1996

[86] PCT No.: PCT/US96/14763

§ 371 Date: Nov. 27, 1998

§ 102(e) Date: Nov. 27, 1998

[87] PCT Pub. No.: WO98/08714

PCT Pub. Date: Mar. 5, 1998

[51] Int. Cl.[7] .................................................. B60R 21/20
[52] U.S. Cl. ...................................... 280/728.3; 280/732
[58] Field of Search ................................. 280/728.3, 732

[56] References Cited

U.S. PATENT DOCUMENTS 5,082,310  1/1992  Bauer ................................. 280/728.3
5,335,939  8/1994  Kuriyama et al. .................. 280/728.3
5,478,106  12/1995  Bauer et al. ........................ 280/728.3
5,492,360  2/1996  Logeman ............................ 280/728.3

*Primary Examiner*—Kenneth R. Rice
*Attorney, Agent, or Firm*—Roger D Emerson; Emerson & Associates

[57] ABSTRACT

An air bag door assembly having a multi-layered construction including a rigid underlying substrate is provided. Disposed around the perimeter of the substrate is an inwardly directed flange having a plurality of flange extensions which function as locking tabs. The locking tabs deflect inwardly toward the undersurface of the door assembly as the assembly is seated in an opening in a vehicle trim panel. The locking tabs remain slightly deflected and press against the edge of the opening to retain the door assembly in a seated position. Upon deployment of the air bag, the locking tabs are disengaged by the force of the inflating air bag pushing outward against the undersurface of the substrate.

14 Claims, 2 Drawing Sheets

INSTRUMENT PANEL PASSENGER SIDE AIR BAG DOOR

TECHNICAL FIELD

This invention pertains to the art of methods for manufacturing an air bag door assembly for use with a supplemental restraint system, and more specifically to methods for manufacturing a rigid door assembly having locking tabs to selectively seat the assembly in an opening in a vehicle trim panel.

BACKGROUND ART

Automotive vehicles have long utilized restraint systems for the safety of vehicle passengers. Initially, such restraint systems included seat belts which fit over the occupant's lap. Later many restraint systems were modified to add an additional strap, or shoulder harness, which crossed the occupant's chest and further protected them against impacts. Of late, air bag supplemental restraint systems have become increasingly popular. A typical air bag supplemental restraint system includes an inflatable bag which is stored in a deflated condition within the vehicle steering wheel or trim panel. Upon a relatively severe impact, the air bag is rapidly inflated and deployed into the passenger compartment through various means and openings.

One way of deploying an inflating air bag into the passenger compartment involves the displacement of an air bag door assembly which is seated in an opening in the trim panel.

In the art, various designs for door assemblies have been proposed. U.S. Pat. No. 5,308,111 discloses an air bag system including a hinged cover door. The cover door is thicker around its perimeter due to the presence of a flange. However, because of placement of air bag assemblies in vehicle trim panels at locations where they are subjected to high temperatures (240 degrees Fahrenheit), the door assembly may warp and unseat from the vehicle trim panel. The present invention is directed to a air bag door assembly which is strengthened against warping and is prevented from inappropriately unseating from the vehicle trim panel by use of one or more flange extensions that function as locking tabs.

DISCLOSURE OF INVENTION

In accordance with the practice of the present invention there is provided an air bag door assembly and method for producing the same for use in a vehicle equipped with an air bag supplement restraint system.

More particularly, in accordance with the present invention, an air bag door assembly comprises a layered construction wherein foam material is disposed between an underlying substrate and an overlying skin. The door assembly further comprises an inwardly directed flange arranged about the perimeter of the underlying substrate. During the manufacturing process, the flange serves as a foam shut-off to eliminate foam flash from the undersurface of the door assembly after the foam cure cycle. Additionally, during the trimming process, the flange provides a rigid surface against which a hot knife can cut. The flange also serves to impart rigidity to the door assembly to prevent warping and unseating.

In accordance with one aspect of the present invention, the door assembly is characterized by means for strengthening which is disposed about a perimeter of the underlying substrate.

In accordance with another aspect of the invention, the strengthening means comprises an inwardly directed flange extending a predetermined minimum length from an undersurface of the underlying substrate.

In accordance with another aspect of the invention, the flange includes at least one flange extension having a stem of predetermined width. The stem is internally deflectable toward the undersurface of the substrate from a first vertical position to a second engaging position. The second engaging position is associated with an engaging angle $\alpha$.

According to another aspect of the invention, the flange extension further includes a head portion which comprises an engaging surface. The engaging surface selectively contacts the vehicle trim panel near a periphery of the opening therein.

According to another aspect of the invention, a method of producing an air bag door assembly is characterized by the steps of:

forming an inwardly directed flange around a perimeter of the underlying substrate, the flange having a minimum length;

introducing the foam material between the overlying skin and the underlying substrate;

trimming the foam material and the overlying skin with a hot knife, the hot knife contacting an external surface of the flange.

According to another aspect of the invention method, the foam material is prevented from contacting an undersurface of the underlying substrate. The flange directs placement of the foam material during the step of introducing the foam material between the overlying skin and the underlying substrate.

According to another aspect of the inventive method, the foam material is also introduced on the external surface of the flange. During the trimming step, the knife is positioned so that a portion of the foam material on the external surface of the flange is removed.

According to another aspect of the inventive method, a flange extension is formed at a first location by extending the flange length, the flange extension comprises a stem having a predetermined width.

According to another aspect of the inventive method, a head portion is formed on a distal end of the stem, the head portion comprising an engaging surface.

According to another aspect of the invention, a method of displacing an air bag door assembly from an engaged position is characterized by the steps of:

equipping the underlying substrate with an inwardly directed flange about a perimeter thereof, the flange having a minimum flange length;

forming a vertical flange extension at a first location by extending the flange length, the flange extension comprising a stem having a predetermined width and a head portion, the head portion having a sloped engaging surface;

positioning the door assembly in the engaged position relative to the vehicle trim panel so that the stem has an internal displacement associated with an engaging angle $\alpha$, and the engaging surface of the head portion contacts the vehicle trim panel near a periphery of the opening;

increasing the internal displacement of the stem in response to the air bag inflation to remove the engaging surface from contact with the vehicle trim panel.

One advantage to the present invention is the enhanced rigidity of the door assembly provided by the flange around the perimeter of the substrate. The increased rigidity lessens the likelihood of thermal distortion due to solar radiation.

Another advantage of the present invention is the provision of rigid surface forming on the undersurface of the substrate;

Another advantage of the present invention is the provision of a rigid surface against which a hot knife can trim the cured assembly.

Another advantage of the present invention is the way in which the door assembly is maintained in the opening of the vehicle trim panel until deployment of an air bag.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangements of parts, a preferred embodiment of which will be described in detail in this specification and illustrated in the accompanying drawings which form a part hereof and wherein.

DETAILED DESCRIPTION OF THE INVENTION

Figure 1:
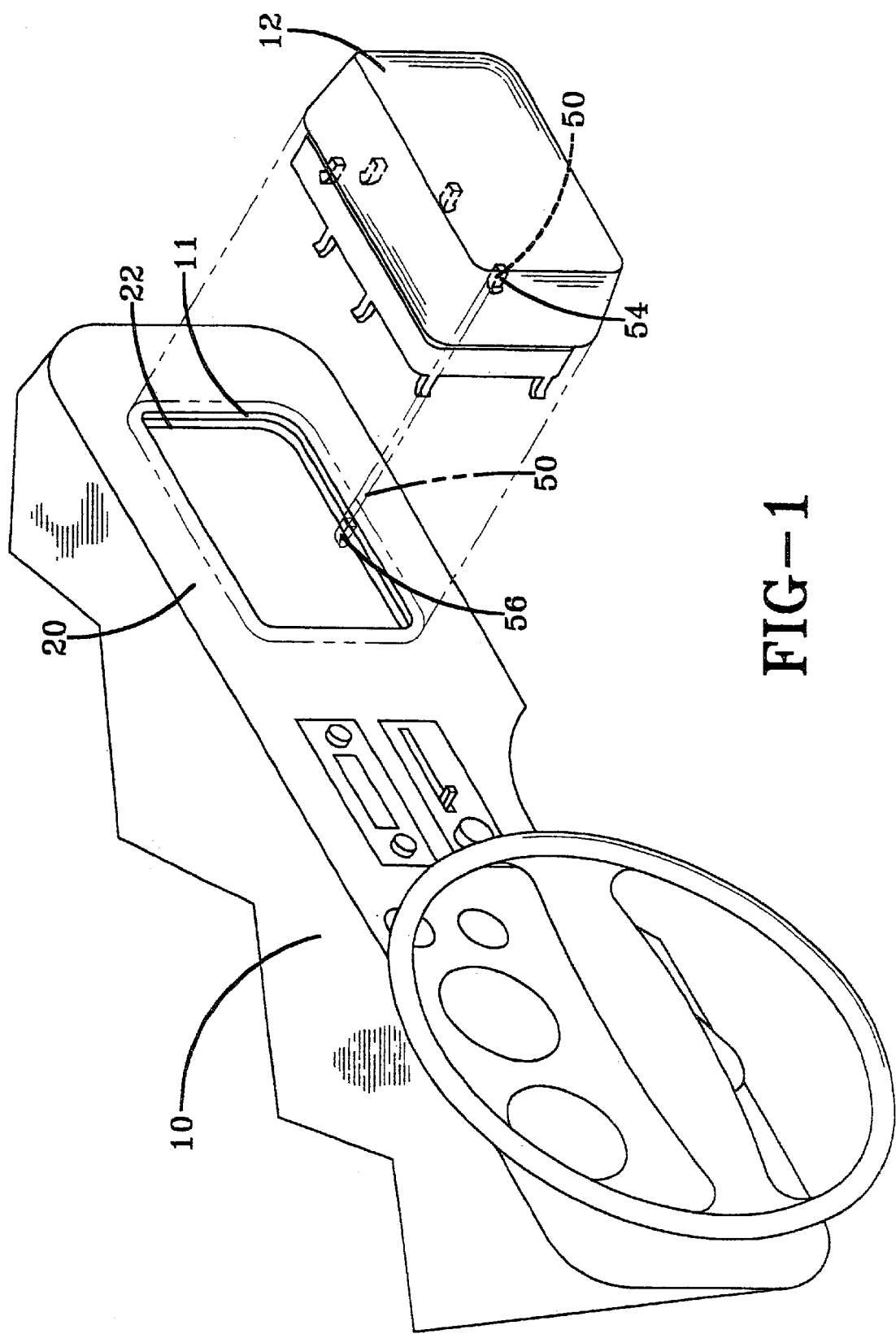
FIG. 1 is an exploded view of a vehicle trim panel and an associated air bag door assembly according to the invention.

Referring now to the drawings wherein the showings are for purposes of illustrating a preferred embodiment of the invention only and not for purposes of limiting the same, FIG. 1 shows a vehicular trim panel 10 having an opening 11 therein through which a supplemental restraint system air bag (not shown) may be deployed upon rapid deceleration of the vehicle such as occurs in a vehicle collision. An associated air bag door assembly 12 is adapted to be seated in the opening 11 in the trim panel 10.

Figure 2:
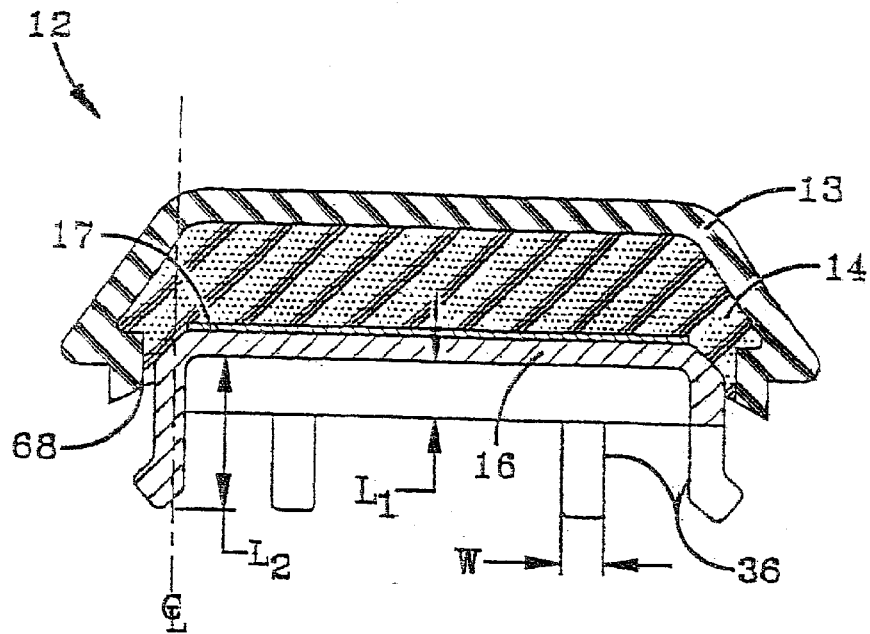
FIG. 2 is a sectional view of the door assembly taken along 2—2 of FIG. 1.

As shown in FIG. 2, the door assembly 12 comprises a layered construction including an outer skin 13, foam material 14, and an underlying substrate 16. In addition, the door assembly may include a layer of plastic cladding 17. In accordance with the present invention, the skin 13 of the door assembly 12 comprises polyvinyl chloride or other material corresponding to the outer surface 20 of trim panel 10 to minimize the presence of the door assembly 12 as viewed by a passenger in the vehicle.

Figure 3:
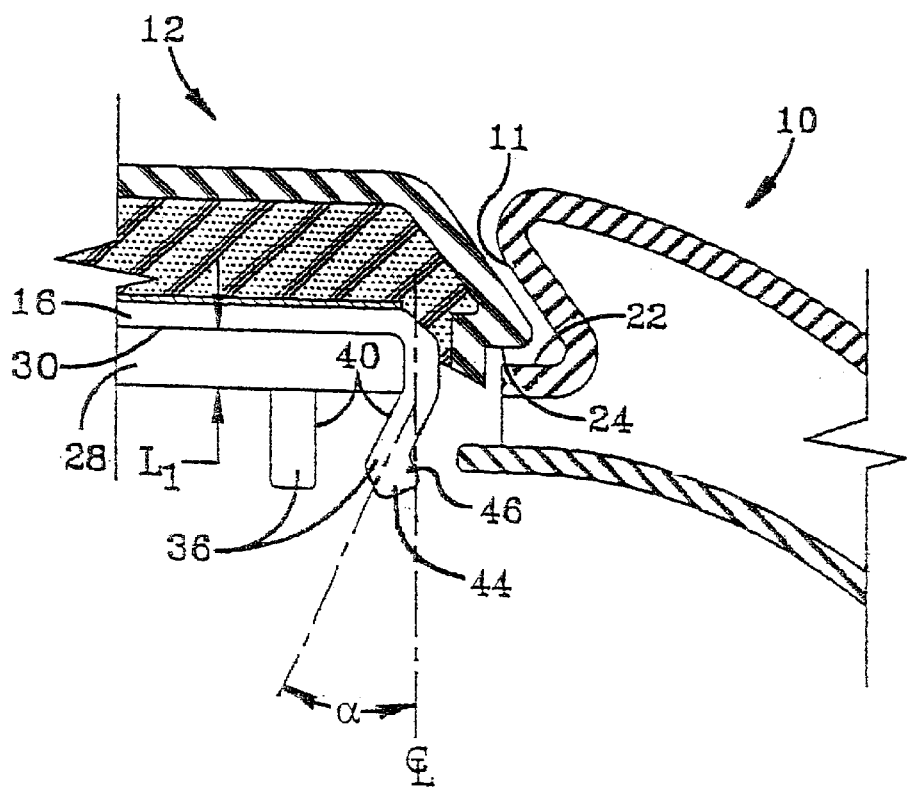
FIG. 3 is a side sectional view of a door assembly being seated in the opening of the rim panel.

With reference to FIG. 3, the trim panel 10 includes a seat 22 around the periphery of opening 11. The door assembly 12 includes a mating seating surface 24 which contacts seat 22 when the door assembly 12 is seated in the opening 11.

The underlying substrate 16 includes an inwardly directed flange 28 extending a minimum length $L_1$ from undersurface 30 along the entire perimeter thereof. "Inwardly" meaning in a direction away from the passenger compartment when the door assembly is seated in opening 11. The flange 28 is generally vertical to the undersurface 30 of substrate 16. In a preferred embodiment, the flange vertical $L_1$ is between 6 mm to 25 mm with a preferred length of 12 mm.

At a plurality of locations around the substrate perimeter, the flange 28 is lengthened and reshaped to form flange extensions 36. Each of the flange extensions 36 includes a deflectable stem 40 and a wedged shaped head portion 44 having a sloped engaging surface 46. When the door assembly 12 is installed into a seat 22 around the periphery of the opening 11 in trim panel 10, the stem 40 of each flange extension 36 is internally deflected toward the undersurface 30 of substrate 16. "Internally" referring to movement from a vertical position toward the undersurface 30. The mating surface 24 of the door assembly 12 rests against the seat 22 around the periphery of the opening 11. In an engaged position, the stem 40 remains partially deflected from the vertical as shown by engaging angle α and the sloped engaging surface 46 contacts the vehicle trim panel 10 near a periphery of the opening 11 therein. The flange extensions 36 thus function as locking tabs to retain the door assembly 12 in an engaged position. The angle α ranges between 5 degrees and 60 degrees with a preferred embodiment having an angle α equal to about 30 degrees.

With reference again to FIG. 2, the flange extensions 36 may have a width W of from 15 mm to 40 mm and an overall length $L_2$ of from 15 mm to 50 mm with a preferred length of 30 mm. In a preferred embodiment of the invention, the door assembly 12 may have as many as five flange extensions 36. The number and positioning of flange extensions 36 is based on overall size and geometry considerations. By adjusting the characteristics of the flange extensions 36, the amount of force required against the undersurface 30 of the substrate 16 to disengage the head portions 44 can be varied. Choice of the substrate material, flange extension design, and number of flange extensions 36 enables broad application of the present invention.

The invention may be practiced with a door assembly 12 anchored to the trim panel 10 by tether 50. Generally, the tether 50 operates to direct the movement of the door assembly 12 during deployment of the air bag to prevent the door assembly 12 from disengaging completely from the trim panel 10. Tether 50 is attached at one end 54 to undersurface 30 and at the other end 56 to trim panel 10.

A preferred method for manufacturing a door assembly 12 in accordance with the invention will now be described.

An underlying substrate 16 is shaped for use in a door assembly 12. During the shaping process, an inwardly directed flange 28 is formed around the entire perimeter of the substrate 16. The flange 28 has a minimum length $L_1$ and serves to strengthen the ensuing door assembly 12.

The overlying skin 13 and the underlying substrate 16 are positioned for the introduction of foam material 14 therebetween such as in a mold. In a preferred method, uncured foam material 14 is introduced into a central cavity of a closed mold. During the curing process, the foam material 14 reacts and expands to fill the space between the overlying skin 13 and the underlying substrate 16.

The cured door assembly 12 is then trimmed with a hot knife (not shown). In the preferred method, the flange 28 provides a rigid external surface 62 for the hot knife to press against during the trimming process.

The presence of the flange 28 prevents the foam material 14 from contacting the undersurface 30 of the underlying substrate 16 by directing placement of the foam material 14 as it is introduced into the mold. Any foam flash is directed to the external surface 62 of flange 28 and during the trimming process, the knife can be positioned to remove unwanted foam material 14 from the external surface 62 of the flange 28. The hot knife generates trimmed surface 68 which abuts the external surface 62 of flange 28. As shown in FIG. 2, the door assembly 12 comprises a controlled cross-sectional profile.

As flange 28 is being formed around the perimeter of the substrate 16, flange extensions 36 may be formed at a plurality of locations by locally extending the flange length. Each of the flange extensions 36 comprise a stem 40 having a predetermined width W. In the preferred method, a head portion 44 is formed on the distal end 70 of each stem 40. Each head portion 44 includes a sloped engaging surface 46.

The preferred embodiments and methods have been described hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A door assembly (12) adapted for use with an associated supplemental restraint air bag system wherein an inflating air bag enters a passenger compartment of a vehicle through an opening (11) in a vehicle trim panel (10) in response to rapid deceleration of said vehicle by displacing said door assembly, said door assembly comprising a layer of foam material (14) disposed between an overlying skin (13) and an underlying substrate (16), said underlying substrate including an inwardly directed flange (28) extending a predetermined minimum length from an undersurface of underlying substrate about a perimeter thereof, said door assembly being characterized by:

said flange having a plurality of spaced flange extensions (36), each flange extension comprising a stem (40) having a predetermined width, said stem being integrally deflectable from a first vertical position to a second engaging position, said second engaging position being associated with an engaging angle α, wherein said flange extensions are operable to selectively engage said vehicle trim panel near a periphery of said opening and to selectively disengage from said vehicle trim panel upon deployment of said associated supplemental restraint air bag system.

2. The door assembly of claim 1, wherein each of said flange extensions further comprises a head portion (44) located at a distal end of said stem, said head portion comprising an engaging surface (46).

3. The door assembly of claim 2 wherein said engaging surface selectively contacts said vehicle trim panel near a periphery of said opening.

4. The door assembly of claim 1 wherein said minimum flange length is between 6 mm and 25 mm.

5. The door assembly of claim 1 wherein α measures between 5 degrees and 60 degrees.

6. The door assembly of claim 1 wherein said predetermined width is between 15 mm and 40 mm.

7. A method of producing an air bag door assembly (12) adapted for use with a supplemental restraint air bag system wherein an inflating air bag enters a passenger compartment of a vehicle through an opening in a vehicle trim panel (10) in response to rapid deceleration of said vehicle by displacing said door assembly, said door assembly comprising a layer of foam material (14) disposed between an overlying skin (13) and an underlying substrate (16), the method including the step of forming an inwardly directed flange (28) around a perimeter of said underlying substrate, said flange having a minimum length, the method being characterized by the steps of:

introducing said foam material between said overlying skin and said underlying substrate; and, trimming said foam material and said overlying skin wherein an external surface (62) of said flange is utilized to provide a controlled cross-sectional profile of said door assembly.

8. The method of claim 7 further comprising the step of:

preventing said foam material from contacting an undersurface (30) of said underlying substrate.

9. The method of claim 8 wherein said step of preventing said foam material from contacting said undersurface of said underlying substrate comprises:

utilizing said flange to direct placement of said foam material during said step of introducing said foam material between said overlying skin and said underlying substrate.

10. The method of claim 7 further comprising the step of:

introducing said foam material on said external surface of said flange.

11. The method of claim 10 wherein said step of trimming said overlying skin and said foam material comprises:

removing a portion of said foam material on said external surface of said flange.

12. The method of claim 7 further comprising the step of:

forming a plurality of spaced flange extensions (36) by extending said flange length in a plurality of locations, each of said flange extensions comprising a stem (40) having a predetermined width.

13. The method of claim 12 further comprising the step of:

forming a head portion (44) on a distal end of each of said stems, each of said head portions having an engaging surface (46).

14. A method of displacing an air bag door assembly (12) from an engaged position in a vehicle equipped with a stored air bag to allow said air bag to enter a passenger compartment of said vehicle through an opening (11) in a vehicle trim panel in response to rapid deceleration of said vehicle, said door assembly comprising a layer of foam material (14) disposed between an overlying skin (13) and an underlying substrate (16) having an inwardly directed flange (28) about a perimeter thereof, said flange having a minimum flange length, said air bag pressing against an undersurface (30) of said substrate upon inflation thereof, the method being characterized by the steps of:

forming a plurality of vertical flange extensions (36) at a plurality of stem (40) having a predetermined width and a head portion (44), said head portion having an engaging surface (46);

selectively positioning said door assembly in said engaged position relative to said vehicle trim panel so that each of said stems has an internal displacement associated with an engaging angle α, and each of said engaging surfaces of said head portions contacts said vehicle trim panel near a periphery of said opening; and, increasing said internal displacement of said stems in response to said air bag inflation to remove said engaging surfaces from contact with said vehicle trim panel.

\* \* \* \* \*